(12) United States Patent
Starling

(10) Patent No.: US 6,398,369 B1
(45) Date of Patent: Jun. 4, 2002

(54) SURFACE COVERING INTENDED TO BE USED ON MARKING COVERINGS FOR ROADS, PARKING AREAS AND THE LIKE

(75) Inventor: Hans Starling, Ängelholm (SE)

(73) Assignee: Cleanosol AB (SE)

( * ) Notice: Subject to any disclaimer, the term of this patent is extended or adjusted under 35 U.S.C. 154(b) by 0 days.

(21) Appl. No.: 09/830,069

(22) PCT Filed: Sep. 24, 1999

(86) PCT No.: PCT/SE99/01681

§ 371 (c)(1),
(2), (4) Date: Apr. 20, 2001

(87) PCT Pub. No.: WO00/24969

PCT Pub. Date: May 4, 2000

(30) Foreign Application Priority Data

Oct. 23, 1998 (SE) .............................................. 9803635

(51) Int. Cl.$^7$ .............................................. G02B 5/126
(52) U.S. Cl. ........................ 359/534; 359/535; 359/536; 359/537
(58) Field of Search ................................ 359/534, 535, 359/536, 537, 530, 531, 532, 533, 515, 516, 538, 540, 541

(56) References Cited

U.S. PATENT DOCUMENTS

| | | | | |
|---|---|---|---|---|
| 3,253,146 A | | 5/1966 | Vries ............................ | 250/71 |
| 3,700,305 A | * | 10/1972 | Bingham ..................... | 359/534 |
| 4,573,763 A | | 3/1986 | Thomas ....................... | 350/105 |
| 4,815,818 A | | 3/1989 | Thomas ....................... | 350/102 |
| 4,868,055 A | * | 9/1989 | Sakata et al. ................ | 428/402 |
| 5,677,050 A | * | 10/1997 | Bilkadi et al. .............. | 428/331 |
| 5,817,402 A | * | 10/1998 | Miyake et al. .............. | 428/159 |
| 5,959,775 A | * | 9/1999 | Joseph et al. ................ | 359/538 |

FOREIGN PATENT DOCUMENTS

GB    2 043 673 A    10/1980

* cited by examiner

*Primary Examiner*—Mohammad Sikder
(74) *Attorney, Agent, or Firm*—Lerner, David, Littenberg, Krumholz & Mentlik, LLP

(57) ABSTRACT

Surface coverings for marking road surfaces are disclosed including elastic particles for application to the road surface, the elastic particles including a plurality of light reflectors such as glass beads or ceramic particles, which can also include various pigments.

9 Claims, 3 Drawing Sheets

SURFACE COVERING INTENDED TO BE USED ON MARKING COVERINGS FOR ROADS, PARKING AREAS AND THE LIKE

BACKGROUND OF THE INVENTION

The present invention relates to a surface covering that is intended to be used on marking coverings for roads, parking areas and the like, and which is designed to give optical directions. To give optical directions, the marking must be visible to the road-users, especially drivers of motor vehicles, and give directions as to how to drive, cycle or walk, or where to park their vehicles.

Road markings of this kind are used in every country where there is a sufficiently high level of traffic, especially vehicular traffic, and where the roads have a solid surface, such as those made of asphalt or concrete. These road markings can have different colors, but are generally white.

Road markings are generally made with thermoplastic materials or similar materials, which are laid on the roadway in the molten state. The marking material is mainly a paint, which can be either water-based or solvent-based. However, multi-component systems, often called cold plastics, are also used. In addition, the marking material can be provided in the form of tapes. These tapes are supplied as "ready-made markings" and are fixed to the roadway with the aid of an adhesive layer applied to their underside. The markings can be in the form of continuous lines running along the edge of the road; parallel transverse stripes; continuous or other lines in the middle of the roadway, or arrows indicating the driving direction. Parking areas are also generally provided with such markings. Besides a binder, the marking materials often comprise fillers and light-reflecting beads that make the markings readily visible when light is shone on them in the dark.

These road marking materials can have very different structures and chemical compositions. Examples of such road marking materials are described in U.S. Pat. No. 3,253,146 and British Patent No. 2,043,673. All of the known markings in use are wear-resistant to a certain extent, and after being applied, they can withstand the load to which they are subjected e.g. by the wheels of vehicles.

In the case of flat road markings, the light-reflecting glass beads lie below the surface for the greater part of their size. In dry weather, the light beam of a car impinges on the upper part of these glass beads, and the light is reflected back from the rear inside surface of the beads, so that the beads and the road marking can be easily seen. In damp weather or rain, however, a film or layer of water is formed on these beads, as a result of which the light is not reflected back, but is deflected in the direction of the light beam. In such a case, the road marking cannot be readily seen, and its efficiency in the dark in difficult conditions may be reduced by 80 to 90% in comparison with its efficiency under dry conditions. It is therefore desirable to somehow raise the glass beads above the surface, so that they lie above the layer of water. However, the problem with this solution is that the beads are then subject to excessive wear and tear, caused especially by studded tires, while snowplows—where used—can simply shave the projecting beads off. The situation is the same with the transverse stripes, where the road markings between the stripes are completely invisible in damp weather. If the beads are arranged on a firm base, and project up between these stripes, they are again quickly worn off by the wheels of vehicles, especially if these are fitted with studs, and they are also shaved off by snowplows.

SUMMARY OF THE INVENTION

In accordance with the present invention, these and other objects have now been realized by the invention of surface coverings for use in marking a road surface comprising elastic particles for application to the road surface, the elastic particles including a plurality of light reflecting members including glass beads and/or ceramic particles. In a preferred embodiment, the elastic particles include pigments. Preferably the pigments include pigments such as fluorescent pigments, phosphorescent pigments and/or color pigments.

In accordance with one embodiment of the surface coverings of the present invention, the elastic particles comprise an elastic material such as elastomers or thermoplastic elastomers. In a preferred embodiment, the elastomers include natural rubber, styrene rubber, chloroprene rubber, ethylene propylene diene monomer rubber, nitrile rubber, fluorocarbon rubber, silicone rubber and/or polyurethane rubber.

In accordance with another embodiment of the surface coverings of the present invention, the thermoplastic elastomers include styrene isoprene styrene rubber, styrene butadiene styrene rubber, ethylene vinyl acetate copolymer, thermoplastic olefins, thermoplastic urethanes, polyesters, polyethers, and/or polyamides.

In accordance with another embodiment of the surface coverings of the present invention, the surface covering comprises a monolayer of the elastic particles.

In accordance with another embodiment of the surface coverings of the present invention, the surface covering comprises multiple layers of the elastic particles.

In accordance with another embodiment of the surface coverings of the present invention, the elastic particles have a shape such a spherical, conical, rod-shaped, rhomboidal or cubic shapes.

In accordance with a preferred embodiment of the surface coverings of the present invention, the elastic particles have a size of between 0.5 mm and 20 mm.

The need to solve the above problems have long been felt, and the aim of the present invention is therefore to provide a surface covering which is intended to be used on marking coverings for roads, parking areas and the like, characterized in that it consists of elastic particles comprising light-reflecting glass beads or ceramics.

The surface covering according to the present invention suitably comprises one or more pigments, possibly including fluorescent and/or phosphorescent ones, and pigments that confer color and covering ability on it.

Besides the glass beads or ceramics, the particles according to the present invention suitably consist mainly of elastomers, such as natural rubber, styrene rubber, chloroprene rubber, ethylene propylene diene monomer (EPDM) rubber, nitrile rubber, fluorocarbon rubber, silicone rubber or polyurethane rubber, or of thermoplastic elastomers, such as styrene-isoprene-styrene (SIS) rubber, styrene butadiene-styrene (SBS) rubber, ethylene-vinyl acetate copolymer (EVA), thermoplastic olefins, thermoplastic urethanes, polyesters, polyethers, polyamides, and/or mixtures of these.

Furthermore, the surface covering according to the present invention suitably consists of particles forming a single particle layer (monolayer).

The particles according to the present invention are suitably spherical, conical, rod-shaped, rhomboidal or cubic in shape.

The particles according to the present invention should have a size of between 0.5 mm and 20 mm.

BRIEF DESCRIPTION OF THE DRAWINGS

The present invention is described below in more detail with reference to the following detailed description, which in turn refers the attached drawings, where.

DETAILED DESCRIPTION

Figure 1:
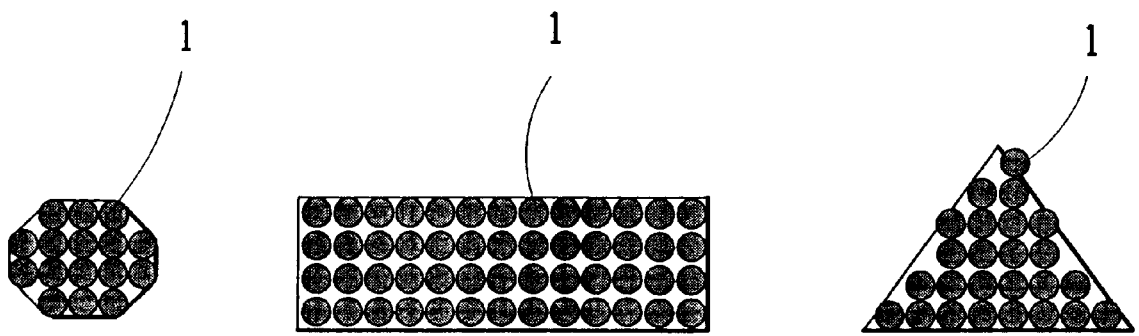
FIG. 1 is a side, elevational diagrammatic representation of three different embodiments of the elastic particles according to the present invention

FIG. 1 shows a cross section of three embodiments of the elastic particles according to the present invention. The particle on the left in FIG. 1 is approximately spherical, that in the middle is rod-shaped, and the particle on the right is conical. The figure is only diagrammatic, and other embodiments are also possible.

As can be seen from FIG. 1, the particles are composed of a large number of beads 1, which are embedded in an elastic binder. This binder consists of some type of elastomer, such as natural rubber, styrene rubber, chloroprene rubber, ethylene propylene diene monomer (EPDM) rubber, nitrile rubber, fluorocarbon rubber, silicone rubber or polyurethane rubber, or of thermoplastic elastomers, such as styrene-isoprene-styrene (SIS) rubber, styrene-butadiene-styrene (SBS) rubber, ethylene vinyl acetate (EVA) copolymer, thermoplastic olefins, thermoplastic urethanes, polyesters, polyethers, polyamides, and/or mixtures of these. The particles illustrated in FIG. 1 comprise glass beads throughout their mass, but it is also possible to apply the glass beads only to their surface. In the embodiments illustrated, the glass beads are placed in a mold, and the elastomer mass is poured over them and then vulcanized. However, other manufacturing processes can also be used, in which the rubber mass is first shaped, and the glass beads are then applied to its surface later. It is important to ensure, however, that the glass beads do not lie too close to one another, otherwise they risk being crushed during deformation of the particle.

Figure 2:
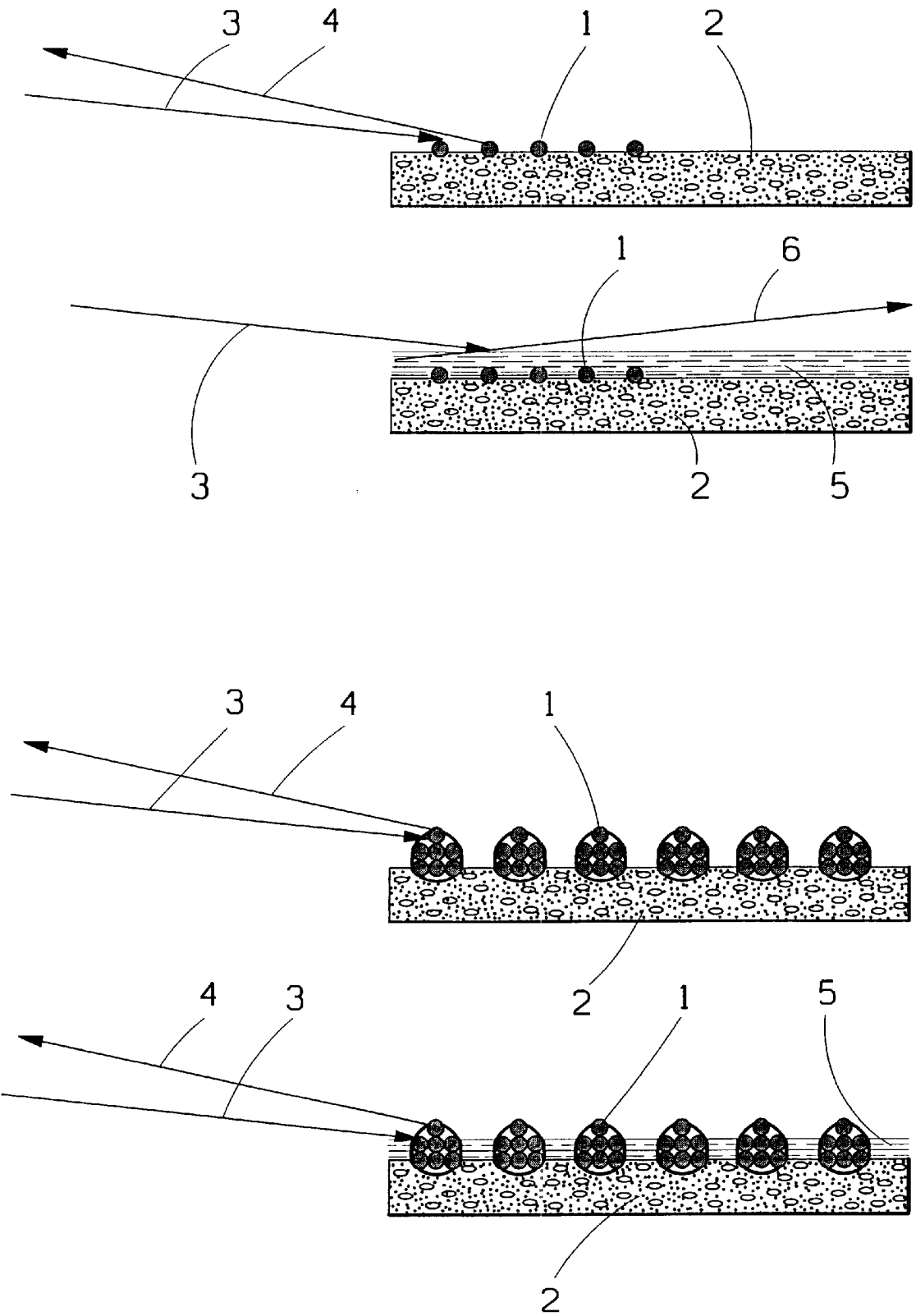
FIG. 2 is a side, elevational diagrammatic representation showing how the light is reflected and deflected by a road marking of the known type in dry and wet weather, and how the light is reflected by a road marking in the case of a surface covering according to the present invention in dry and wet weather.

FIG. 2 shows four cases, of which the upper two refer to a bead-containing covering according to the prior art, while the lower two refer to coverings with the elastic particles according to the present invention.

In the upper two drawings, the glass beads 1 are applied to the surface of a road marking 2 according to the prior art. A beam of light 3, coming e.g. from the headlights of a car, impinges on the glass beads at an acute angle and is reflected back to the driver as a light beam 4, travelling along almost the same path as the beam 3, but in the opposite direction. The lower of these top two drawings shows the case when the beads 1 are covered by a layer of water 5. The beam 3 from the headlights is now deflected to form a beam 6 that is not reflected back to the driver. This means that the driver does not see this beam, and so the visibility of the road marking is greatly reduced.

The upper of the two lower drawings shows how the light is reflected when the particles according to the present invention are used on the road marking 2. The particles, which can have a height of from about 0.5 to 20 mm and comprise glass beads 1 either on their surface or distributed throughout their mass, are hit very favorably by the light beam 3, which is reflected back as a light beam 4. This part of the figure shows the situation in dry weather, while the lower drawing shows the case when there is a layer of water 5 lying on the marking 2. In this case, the beads 1 project above the layer of water 5 and therefore reflect the light 3 back as a beam 4 in the same way as in the previous case when the road is dry.

Figure 3:
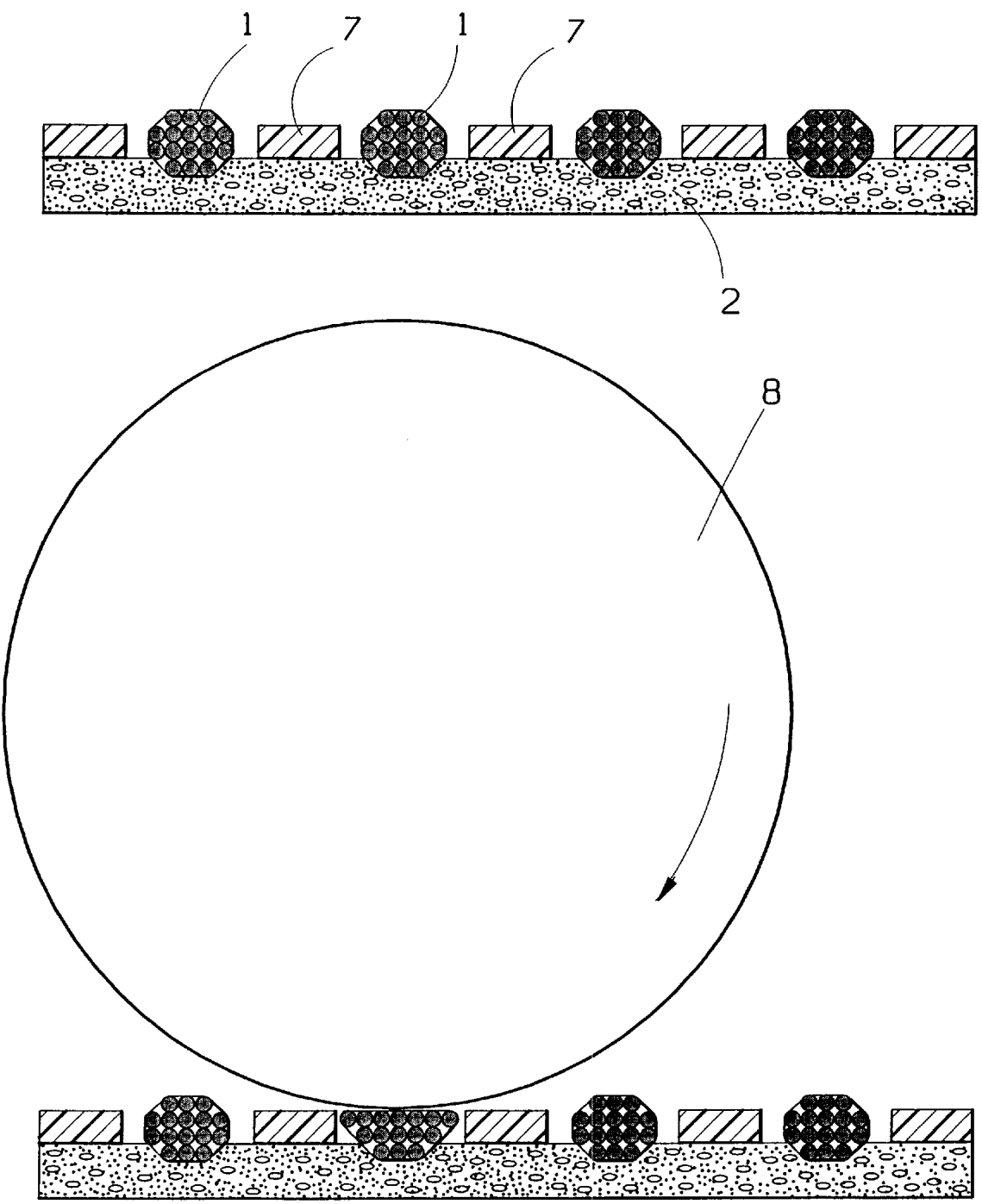
FIG. 3 is a side, elevational view of the elastic particles of the present invention applied between transverse stripes on a roadway, in the unloaded and the loaded state.

FIG. 3 shows how the particles are applied to a road marking 2 that comprises transverse stripes 7. The elastic particles according to the present invention project somewhat above the stripes 7, and the marking is therefore very clearly seen.

The lower part of FIG. 3 shows how the elastic particles are pressed together under loading, exerted e.g. by the wheel 8 of a car. The second particle from the left is depressed, while the first particle from the right, which was depressed before, has returned to its original state. In this way, the visibility of the marking is preserved, and the marking is not abraded in the same way as a hard, brittle marking. Even if e.g. a snowplow is driven over the covering, the particles according to the present invention yield and are pressed down, after which they rise again instead of being shaved off.

In addition to the glass beads that are embedded in or applied to the elastic material, the elastic particles can also comprise a pigment, which confers color and covering ability on them. The use of a pigment is part of the prior art and is often necessary if the glass beads or ceramics are to reflect light to a sufficient extent. Pigments also improve the visibility in daylight. Fluorescent and/or phosphorescent pigments can also be used, but they are expensive, and—if employed in the customary road marking materials—they must be admixed to the whole material, which means that a large amount of such a pigment is needed. According to the present invention, on the other hand, it is possible to admix the pigment only with the elastic particles, so that less pigment is needed, and surface coverings having these properties are therefore more economic. If required, friction compounds can also be added to the material.

The elastic particles according to the present invention have been described here as a surface layer on conventional road markings. Single particle layers (monolayers) can be used, but there can also be a number of layers, or the particles can be spaced out more than they are when forming a continuous layer. It is also possible to lay these particles directly on the roadway without any marking layer. A binder of some kind can then act as a covering layer or the elastic particles can be pressed into an unsolidified binding asphalt layer. It is also possible to lay the particles down in the form of various patterns, which can be done for example with the aid of special machines. To make the particles adhere to the surface of a customary road marking, they are applied to the latter before the road marking or the binder has set, or they are bound to a dry road marking with the aid of a primer or adhesive.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Surface coverings for use in marking a road surface comprising elastic particles for application to said road surface, said elastic particles including a plurality of light reflecting members selected from the group consisting of glass beads and ceramic particles, wherein said elastic particles have a size of between 0.5 mm and 20 mm.

2. The surface covering of claim 1 wherein said elastic particles include pigments.

3. The surface covering of claim 2 wherein said pigments are selected from the group consisting of fluorescent pigments, phosphorescent pigments, and colored pigments.

4. The surface covering of claim 1 wherein said elastic particles comprise an elastic material selected from the group consisting of elastomers and thermoplastic elastomers.

5. The surface covering of claim 4 wherein said elastomers are selected from the group consisting of natural rubber, styrene rubber, choloroprene rubber, ethylene propylene diene monomer rubber, nitrile rubber, fluorocarbon rubber, silicone rubber, and polyurethane rubber.

6. The surface covering of claim 4 wherein said thermoplastic elastomers are selected from the group consisting of styrene-isoprene-styrene rubber, styrene-butadiene-styrene rubber, ethylene vinyl acetate copolymer, thermoplastic olefins, thermoplastic urethanes, polyesters, polyethers, polyamides, and mixtures thereof.

7. The surface covering of claim 1 comprising a monolayer of said elastic particles.

8. The surface covering of claim 1 comprising multiple layers of said elastic particles.

9. The surface covering of claim 1 wherein said elastic particles have a shape selected from the group consisting of spherical, conical, rod-shaped, rhomboidal, and cubic shapes.

* * * * *